March 11, 1969   A. A. BUEHLER ETAL   3,431,984
CHECK VALVE VENT AND BLOW AIR METERING PLUG FOR ROCK DRILLS
Filed June 22, 1967

INVENTORS
ALOIS A. BUEHLER
CARL R. PETERSON
BY
*Frank H. Thomson*
ATTORNEY

United States Patent Office 3,431,984
Patented Mar. 11, 1969

3,431,984
CHECK VALVE VENT AND BLOW AIR METERING PLUG FOR ROCK DRILLS
Alois A. Buehler, Easton, Pa., and Carl R. Peterson, Princeton, N.J., assignors to Ingersoll-Rand Company, New York, N.Y., a corporation of New Jersey
Filed June 22, 1967, Ser. No. 648,037
U.S. Cl. 173—78         8 Claims
Int. Cl. E21c 7/04; B25d 17/14; E21b 21/00

ABSTRACT OF THE DISCLOSURE

For use with a rock drill having a check valve in the air supply passage, a plug which serves to vent the check valve should it be desired that no additional blow air be supplying fluid under pressure to the blow air passage. The plug may be positioned so that it only exhausts the check valve should it be desired that no additional blow air be used for cleaning cuttings. It may also be used to provide a passage for blow air when the rock drill has no check valve.

Background of the invention

This invention relates to a rock drill of the down-the-hole type and more particularly to an apparatus for venting the check valve of a rock drill and metering blow air. This invention is particularly applicable, but not limited to rock drills such as that shown in U.S. Patent No. 3,198,264, issued to E. S. Oelke et al. on Aug. 3, 1965.

The type of rock drill shown in the aforementioned patent uses a portion of the exhaust air from the drill hammer for blowing cuttings out of the hole being drilled. In this type of rock drill the hammer is provided with a longitudinal passage which communicates with the chamber in which the drill hammer reciprocates and with a longitudinal bore in the drill bit. When the hammer is raised on its return stroke, exhaust air is vented through this longitudinal bore to supply air to the hole in the drill bit. This air aids in removing cut material from the bottom of the hole being drilled. A valve guide or tubular member is provided which is periodically received by the longitudinal passage in the drill hammer. The passage in the tubular valve guide may be used to supply additional blow air through the drill hammer. A valve chest is provided in the rock drill which is designed so that it allows a certain amount of blow air to reach the valve guide. A check valve is normally positioned in the main air supply passage and is designed to close at a predetermined pressure so that should material such as water under pressure be encountered during drilling, this material will not enter the working parts of the rock drill.

A metering plug is normally provided in the valve guide to control the amount of blow air which is supplied to the drill bit. This metering plug is dimensioned so that the proper amount of blow air will be supplied to the bottom of the hole being drilled. Unfortunately, the size of the metering plug causes a pressure build up in the valve guide passage. This pressure build up acts on the check valve in the main supply passage to thereby close this valve. The incoming air opens the valve and "chattering" results which decreases drill efficiency.

Summary

It is therefore the principal object of this invention to provide apparatus for use with a rock drill which eliminates check valve chattering.

It is a further object of this invention to provide apparatus which will reduce the number of parts which must be stocked in order to have available a rock drill which is capable of drilling in a large variety of earth formations.

In general, these objects are carried out by providing a percussive drill apparatus which comprises a casing defining cylinder and a hammer mounted for reciprocal movement in the cylinder for delivering an impact to a workpiece. There are means defining a passage for admitting fluid under pressure to the cylinder for reciprocating the hammer. Means provide an exhaust for the cylinder. Valve means limits the flow of fluid in the passage to one direction and there are means defining a passage for venting the valve means to exhaust pressure.

Brief description of the drawing

The foregoing and other objects of this invention will become apparent from the following description and drawings wherein.

Description of the preferred embodiment

Figure 2:
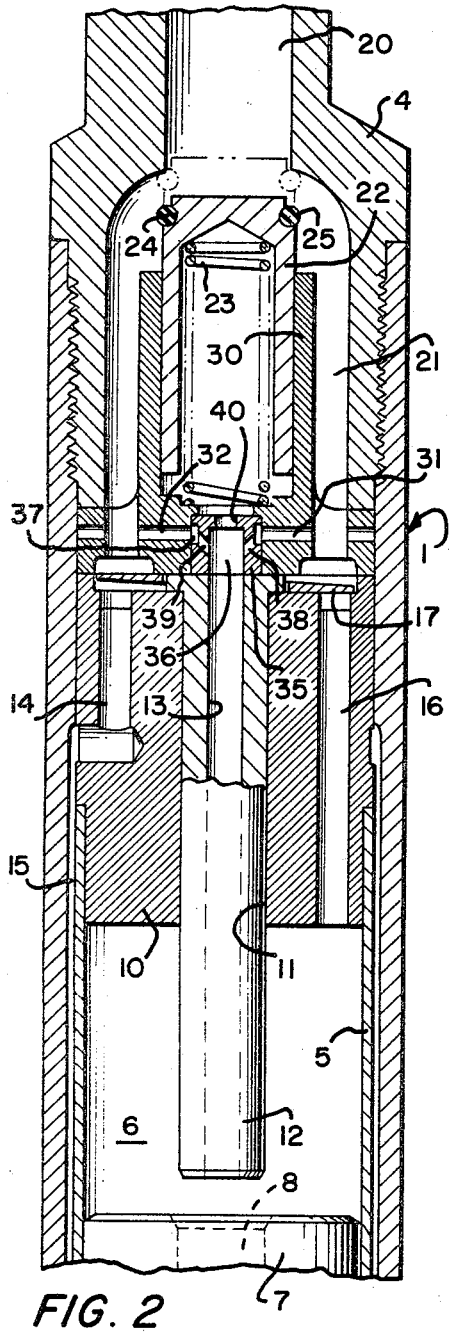
FIG. 2 is a longitudinal sectional view showing a rock drill employing one embodiment of this invention with the check valve shown in an open position.
Figure 1:
FIG. 1 is an overall of a down-the-hole rock drill.

Referring to FIGS. 1 and 2 there is shown a down-the-hole rock drill generally indicated at 1. The drill includes a percussive drill bit 2 and a threaded portion 3 for connecting the rock drill to a drill string. A backhead is generally indicated at 4. The casing 1 has a liner 5 which along with the casing defines a cylinder, the upper portion being indicated at 6. A hammer or piston 7 is mounted for reciprocal movement within the cylinder. The hammer is provided with a longitudinal passage 8 which allows blow air to be conducted to the drill bit 2. As is usual, the drill bit 2 may be provided with a central bore (not shown) for conducting blow air to the bottom of the hole being bored to aid in the removal of cuttings.

A valve seat 10 is mounted within the casing 1 and includes a longitudinal passage 11 which has a valve guide or tubular member 12 mounted therein. The tubular member 12 has a longitudinal passage 13 extending therethrough. Valve seat 10 has a power stroke air passage 16 and a return air passage 14 which connects with return air passage 15. An annular flip-flop valve 17 is mounted on the upper end of the valve guide 12. The backhead of the rock drill is provided with a main supply passage 20 for supplying air under pressure to the cylinder to reciprocate the hammer 7. The passage 20 leads to supply passages 21 leading to passages 14 and 16.

A check valve generally indicated at 22 is slidably mounted in a valve chest 30 and is positioned in the passage 20. The check valve 22 permits fluid under pressure to enter the passages 21 but prevents water or other fluid which may be encountered during drilling operations from entering the working parts of the drill. The check valve includes a return spring 23, annular groove 24 and sealing ring 25.

The operation of the drill of this invention is essentially the same as the operation of many modern drills. If it is assumed that the hammer has just delivered an impact to the drill bit, air under pressure is supplied through passages 20 and 21, around the annular valve 17, through the passage 14 to return passage 15. The air under pressure acts on the lower end (not shown) of hammer 7 to raise the hammer. As the hammer is raised, air is exhausted from the chamber 6 through the blow air passage 8 and other parts (not shown) until the blow air passage 8 is closed by the central tube 12. As the hammer is raised further, there is a build up of pressure in the chamber 6 which rocks the annular flip-flop valve 17 to close passage 14 and open passage 16. Air may then be supplied through air passage 21, power air passage 16 to the chamber 6. This air drives the hammer 7 downward to deliver an impact to the workpiece or drill bit 2.

In many drilling operations, it is desirable to supply additional blow air for removing cuttings from the bottom of the drilled hole. It is conventional to supply this blow air from the main air supply passage to the valve guide and the longitudinal passage in the drill hammer. Unfortunately, there is normally a build up of pressure in the valve guide. This pressure build up is transferred to the check valve and, when combined with the force of spring 23, causes the check valve to open and close rapidly or "chatter."

In order to prevent this chattering of the check valve, we have provided a plug generally indicated at 35 which allows the check valve to be vented to exhaust pressure and allows additional blow air to be supplied. The plug 35 is provided with an annular groove 37 and a pair of ports 38 and 39 communicating with annular groove 37. There is a central passage 40 which, in the embodiment of FIG. 2, communicates with the interior of the check valve 22. The plug is provided with a drilled out portion 36 which is the same size as the passage 13 in this tubular member 12. The cross-sectional area of the passage 40 should equal the cross-sectional area of the passages 38 and 39 when totalled so that the passage 40 will pass the same amount of blow air as the passages 38 and 39 when used as illustrated in FIG. 4.

With the plug of this invention in the position of FIG. 2, blow air may be constantly supplied to the drill bit even when the hammer 7 is in the raised position. In order to carry out this function, the valve chest 30 is provided with a pair of passages 31 and 32. When the plug 35 is positioned as shown in FIG. 2, the passages 31 and 32 register with an annular groove 37 in plug 35 and passages 38 and 39. This arrangement provides communication between the passage for supplying air for reciprocating the hammer and the tubular member 12. Blow air is thus constantly supplied to the exhaust or blow passage 8. There is no build up of pressure in the passage 13 because the passage 13 is open. Since there is no pressure build up in the passage 13, there is none in the check valve 22.

The check valve is constantly vented to exhaust. When the blow passage 8 in the hammer 7 is open, i.e., the tube 12 is out of the passage 8, the chamber 6 is at exhaust pressure which is lower than the incoming air pressure. As the hammer is raised and the blow passage 8 is closed, the check valve 22 remains vented to exhaust through the passage 40 in plug 35, longitudinal passage 13 in the valve guide 12, and the blow passage 8. Since exhaust pressure is substantially lower than the air supply, the incoming air pressure is sufficient to overcome the force of the spring 23 and any air which would enter the check valve through the passage 40. Chattering of the check valve is thus eliminated.

Figure 3:
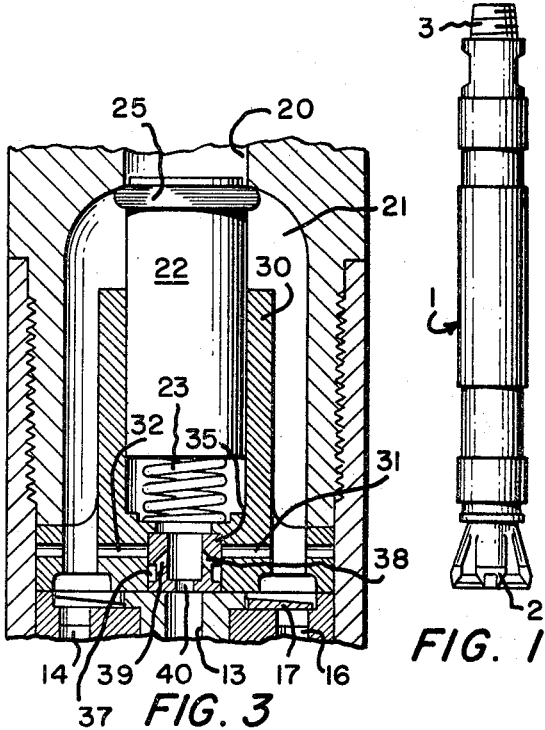
FIG. 3 is a fragmentary view showing a portion of this invention in a different position for achieving a different purpose with the check valve in a closed position.
Figure 4:
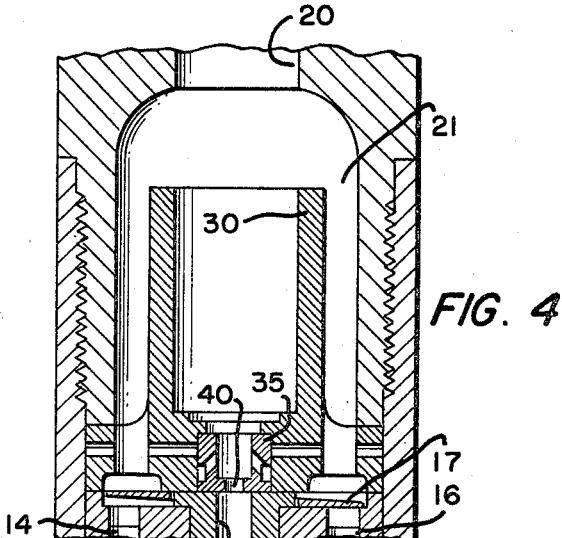
FIG. 4 is a view similar to FIG. 3 showing a rock drill with the check valve removed.

Further advantages of the plug of this invention becomes apparent when considering FIGS. 3 and 4. Referring to FIG. 3 there is shown a drill where it is desired to use a check valve but the type of material in which drilling is to occur is such that it is not necessary to have additional blow air supplied to the drill bit. The passages 38 and 39 are positioned so that the plug 35 can be reversed and the annular groove 37 and passages 38 and 39 are blocked. When the check valve 22 is open, incoming air will be supplied through passage 21 to passages 14 and 16. Since the annular groove 37 is blocked, direct communication between the motive fluid supply passage 20 and the blow passage 8 is blocked. The check valve 22 is still vented to exhaust through vent port 40, passage 13 and blow passage 8.

In FIG. 4 there is shown an embodiment where the check valve has been eliminated but blow air is supplied to the passage 13 and thus the drill bit 2. The plug is positioned so that the passage 40 conducts blow air directly from the passage 20 to the longitudinal passage 13 in the valve guide 12.

The manufacturing advantages of this invention should be readily apparent. All that need be made by the manufacturer is a variety of plugs with various size ports 38, 39 and 40. If more blow air is desired, then the passages 38, 39 and 40 may be increased in size, and conversely, if less blow air is desired, the size of these passages may be decreased. The passages 31 and 32 in valve chest 30 are made sufficiently large so that it is possible to change the amount of blow air without changing the entire valve chest. All that need be changed is the plug 35. Blow air can be eliminated entirely simply by reversing plug 35. With this invention the advantages of the check valve are maintained, yet the chattering often encountered has been eliminated.

From the foregoing it is apparent that the objects of this invention have been carried out. Although this invention has been described for use with a particular type of rock drill, the type of rock drill is not intended to be a limiting factor. It is intended that the foregoing description be merely that of a preferred embodiment and that the invention be limited only by that which is within the scope of the appended claims.

We claim:
1. A percussive drill apparatus comprising:
a casing defining a cylinder;
a hammer mounted for reciprocal movement in said cylinder for delivering an impact to a workpiece;
means defining a passage in said casing for admitting fluid under pressure to said cylinder to reciprocate said hammer;
means in said casing defining an exhaust for said cylinder;
valve means positioned in said passage for limiting the flow of fluid in said passage to one direciton; and
means positioned between said valve means and said means providing an exhaust defining a passage for substantially continuously venting said valve means to exhaust pressure.

2. The apparatus of claim 1 wherein said means defining a venting passage includes a plug reversibly mounted between said valve means and said means providing an exhaust.

3. The apparatus of claim 2 wherein said means providing an exhaust passage includes a bore in said hammer for directing exhaust fluid to the bottom of a hole being drilled and further including a tubular member extending from said plug means towards said hammer, the bore in said hammer adapted to periodically receive said tubular member when said hammer is reciprocated.

4. The apparatus of claim 3 further including means providing a passage for conducting fluid under pressure from said passage for admitting fluid under pressure to said cylinder to said tubular member to thereby increase the amount of fluid under pressure supplied to the bottom of the hole being drilled.

5. The apparatus of claim 3 wherein said plug has at least one passage adapted to provide communication between said passage for admitting fluid under pressure to said cylinder and said tubular member to thereby increase the amount of fluid under pressure supplied to the bottom of the hole.

6. The apparatus of claim 5 wherein the passage in said plug is adapted to provide communication between said passage for admitting fluid under pressure to said cylinder and said tubular member is positioned so that when said plug is reversed, there is no communication between said fluid admitting passage and said tubular member.

7. The apparatus of claim 5 wherein the venting passage has a cross-sectional area equal to the sum of the cross-sectional area of all passages in said plug which are adapted to provide communication between said passage for admitting fluid under pressure to said cylinder and said tubular member.

8. The apparatus of claim 1 further comprising a valve chest mounted in said casing, a tubular member extending downwardly from said valve chest and adapted to communicate with said means providing an exhaust, said valve chest having a plug reversibly mounted therein to provide said venting passage, said valve chest and plug having passages providing communication between said passages for admitting fluid under pressure to said cylinder and tubular member, the passages in said plug being positioned so that when said plug is reversed there is no communication between said passage for admitting fluid under pressure to said cylinder and said tubular member.

References Cited
UNITED STATES PATENTS

| | | | |
|---|---|---|---|
| 3,051,134 | 8/1962 | Lincoln | 173—78 X |
| 3,085,555 | 4/1963 | Morrison | 173—78 X |
| 3,198,264 | 8/1965 | Oelke | 173—73 |
| 3,361,219 | 1/1968 | Sears | 173—78 X |

NILE C. BYERS, JR., *Primary Examiner.*

U.S. Cl. X.R.

175—297